United States Patent
Kuboyama

(10) Patent No.: US 12,086,113 B2
(45) Date of Patent: Sep. 10, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hideo Kuboyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 17/472,204

(22) Filed: Sep. 10, 2021

(65) Prior Publication Data

US 2022/0083516 A1 Mar. 17, 2022

(30) Foreign Application Priority Data

Sep. 14, 2020 (JP) .................. 2020-153996

(51) Int. Cl.
  G06F 16/00 (2019.01)
  G06F 16/21 (2019.01)
  G06F 16/31 (2019.01)
(52) U.S. Cl.
  CPC .......... G06F 16/211 (2019.01); G06F 16/319 (2019.01); G06F 16/325 (2019.01)
(58) Field of Classification Search
  CPC ..... G06F 16/211; G06F 16/319; G06F 16/325
  See application file for complete search history.

(56) References Cited

U.S. PATENT DOCUMENTS

| | | | | |
|---|---|---|---|---|
| 2005/0160110 | A1* | 7/2005 | Charlet | G06F 16/284 707/999.102 |
| 2008/0288549 | A1 | 11/2008 | Rabetge et al. | |
| 2009/0158406 | A1* | 6/2009 | Jancula | G06F 21/46 726/5 |
| 2015/0172419 | A1* | 6/2015 | Toledo | H04L 61/4552 709/203 |
| 2018/0253467 | A1* | 9/2018 | Gurajada | G06F 11/1471 |
| 2021/0248137 | A1* | 8/2021 | Luo | G06F 16/2456 |

FOREIGN PATENT DOCUMENTS

| | | |
|---|---|---|
| JP | 2002-063202 A | 2/2002 |
| JP | 2019020988 A | 2/2019 |

* cited by examiner

*Primary Examiner* — Syed H Hasan
(74) *Attorney, Agent, or Firm* — Canon U.S.A., Inc. IP Division

(57) ABSTRACT

An information processing apparatus includes an acquisition unit configured to acquire data with a first schema and data with a second schema, the data with the first schema including case-insensitive first identification information in identification information for management of data, the data with the second schema including the first identification information corresponding to the identification information and case-sensitive second identification information in the identification information, and a management unit configured to manage the data with the first schema and the data with the second schema in a retrievable manner.

8 Claims, 9 Drawing Sheets

| Step | PROCEDURE | STATE |
|---|---|---|
| S901 | (BEFORE UPDATE) | FIRST APPLICATION REGISTERS AND REFERS TO FIRST SCHEMA (CASE-INSENSITIVE) |
| S902 | MAIN DEVICE PERFORMING ID MANAGEMENT IS UPDATED TO INFORMATION PROCESSING APPARATUS | FIRST APPLICATION REGISTERS AND REFERS TO FIRST SCHEMA (CASE-INSENSITIVE) PREPARATION FOR PROCESSING OF SECOND SCHEMA IS COMPLETED |
| S903 | ONE OR MORE FIRST APPLICATIONS ARE SEQUENTIALLY SWITCHED TO SECOND APPLICATIONS | FIRST APPLICATION REGISTERS AND REFERS TO FIRST SCHEMA (CASE-INSENSITIVE) SECOND APPLICATION REFERS TO FIRST AND SECOND SCHEMAS, AND REGISTERS SECOND SCHEMA (SECOND SCHEMA: CASE-SENSITIVE, FIRST SCHEMA: CASE-INSENSITIVE) |
| S904 | ALL OF FIRST APPLICATIONS ARE COMPLETELY SWITCHED TO SECOND APPLICATIONS | SECOND APPLICATION REFERS TO FIRST AND SECOND SCHEMAS, AND REGISTERS SECOND SCHEMA (SECOND SCHEMA: CASE-SENSITIVE, FIRST SCHEMA: CASE-INSENSITIVE) |
| S905 | FIRST SCHEMA IS UPDATED TO SECOND SCHEMA (CASE-SENSITIVE ID IS REGISTERED) | SECOND APPLICATION REGISTERS AND REFERS TO SECOND SCHEMA (CASE-SENSITIVE) |

FIG.3

| | | |
|---|---|---|
| 301 | Primary Key | adminuser001 |
| 302 | Sub Key | User |
| 303 | realm | realm001 |
| | passwordHash | aaaaaaaa-aaaa-aaaa-aaaa-aaaaaaaa |
| | Attribute1 | AAA |
| | Attribute2 | BBB |
| | registrationDate | 20200101000000 |
| 304 | schemaVersion | 0 |

FIG.4A

| | | |
|---|---|---|
| 401 | Primary Key | adminuser002 |
| 402 | Sub Key | User-AdminUser002 |
| 303 | realm | Realm001 |
| | passwordHash | aaaaaaaa-aaaa-aaaa-aaaa-aaaaaaaa |
| | Attribute1 | AAA |
| | Attribute2 | BBB |
| | registrationDate | 20200101000000 |
| 403 | schemaVersion | 1 |

FIG.4B

| | | |
|---|---|---|
| 401 | Primary Key | adminuser002 |
| 402 | Sub Key | User-ADMINUSER002 |
| 303 | realm | Realm001 |
| | passwordHash | bbbbbbbb-bbbb-bbbb-bbbb-bbbbbbbb |
| | Attribute1 | CCC |
| | Attribute2 | DDD |
| | registrationDate | 20200102000000 |
| 403 | schemaVersion | 1 |

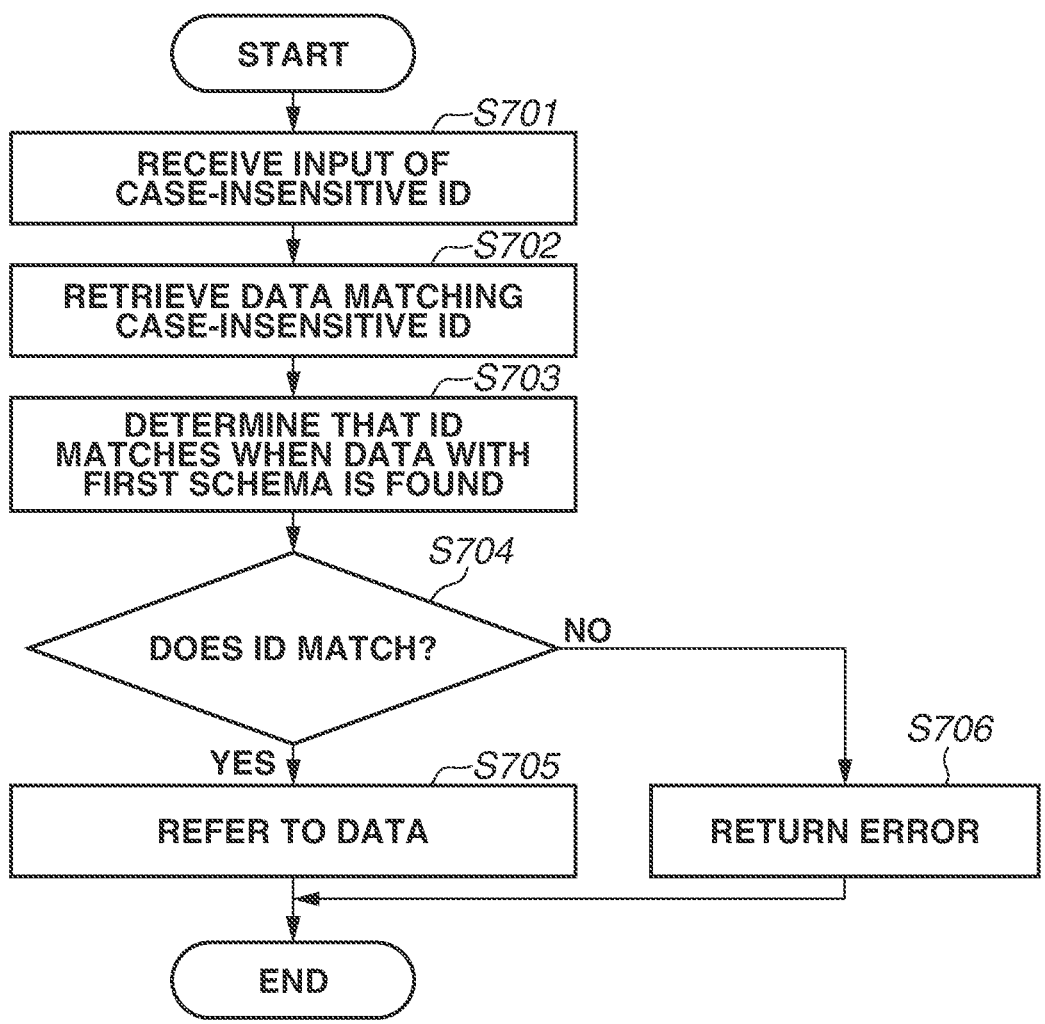

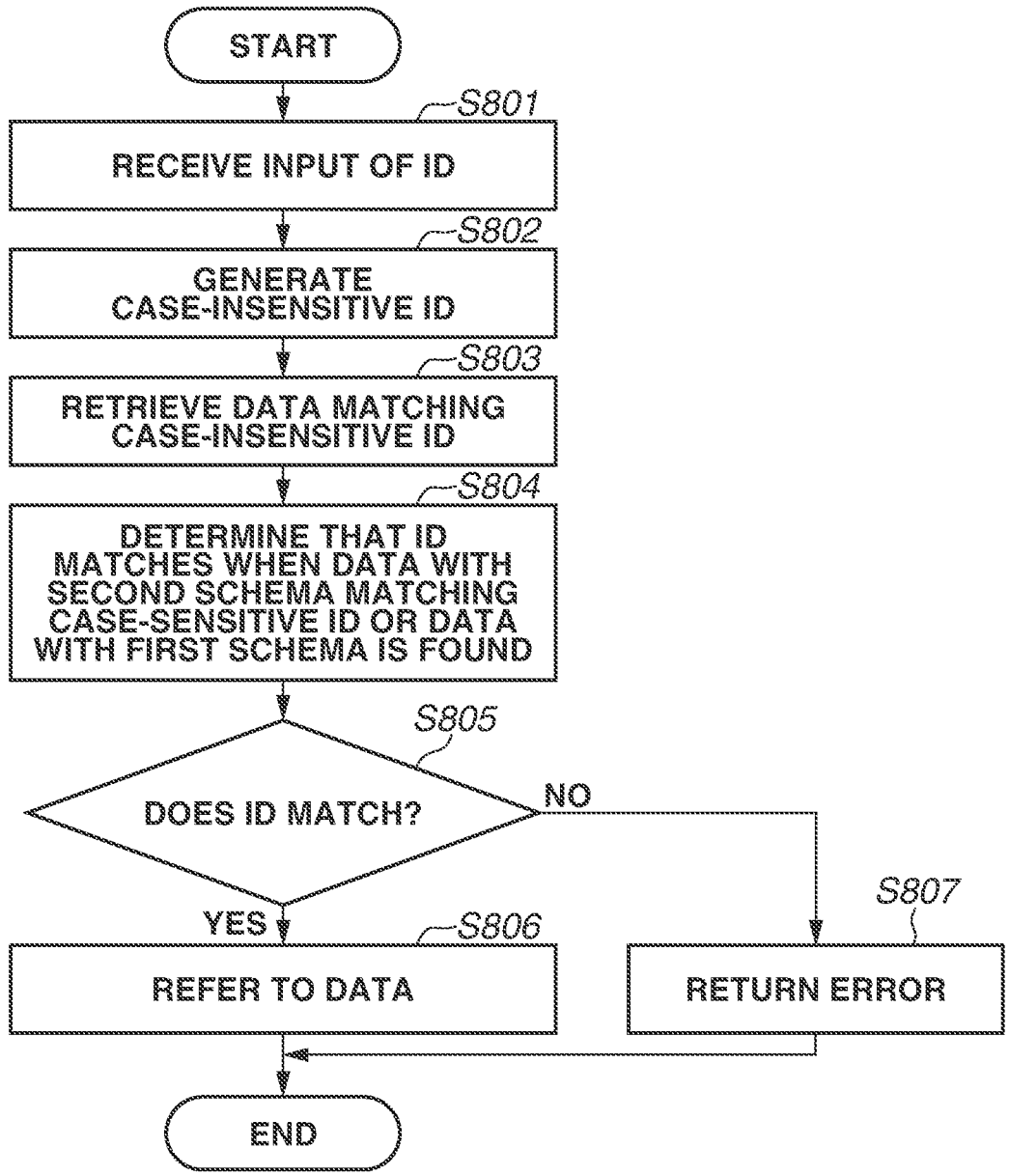

FIG.9

| Step | PROCEDURE | STATE |
|---|---|---|
| S901 | (BEFORE UPDATE) | FIRST APPLICATION REGISTERS AND REFERS TO FIRST SCHEMA (CASE-INSENSITIVE) |
| S902 | MAIN DEVICE PERFORMING ID MANAGEMENT IS UPDATED TO INFORMATION PROCESSING APPARATUS | FIRST APPLICATION REGISTERS AND REFERS TO FIRST SCHEMA (CASE-INSENSITIVE) PREPARATION FOR PROCESSING OF SECOND SCHEMA IS COMPLETED |
| S903 | ONE OR MORE FIRST APPLICATIONS ARE SEQUENTIALLY SWITCHED TO SECOND APPLICATIONS | FIRST APPLICATION REGISTERS AND REFERS TO FIRST SCHEMA (CASE-INSENSITIVE)<br><br>SECOND APPLICATION REFERS TO FIRST AND SECOND SCHEMAS, AND REGISTERS SECOND SCHEMA (SECOND SCHEMA: CASE-SENSITIVE, FIRST SCHEMA: CASE-INSENSITIVE) |
| S904 | ALL OF FIRST APPLICATIONS ARE COMPLETELY SWITCHED TO SECOND APPLICATIONS | SECOND APPLICATION REFERS TO FIRST AND SECOND SCHEMAS, AND REGISTERS SECOND SCHEMA (SECOND SCHEMA: CASE-SENSITIVE, FIRST SCHEMA: CASE-INSENSITIVE) |
| S905 | FIRST SCHEMA IS UPDATED TO SECOND SCHEMA (CASE-SENSITIVE ID IS REGISTERED) | SECOND APPLICATION REGISTERS AND REFERS TO SECOND SCHEMA (CASE-SENSITIVE) | ved
INFORMATION PROCESSING APPARATUS, INFORMATION PROCESSING METHOD, AND STORAGE MEDIUM

BACKGROUND

Field of the Disclosure

The present disclosure relates to information processing apparatuses, information processing methods, and storage media.

Description of the Related Art

Management of various kinds of data may involve assigning an identification (ID, namely, identification information) to data to be managed to use the ID as a key to manage the data. As a specific example, some systems providing web services assign an ID to a piece of data, associate the ID with the user, the password of the client, attribute information, and other information, and manage those pieces of information. In such cases, the uniqueness of the ID, consisting of English capital and lower-case letters, in using IDs to manage various kinds of data may be ensured with case sensitivity or case insensitivity.

For example, Japanese Patent Application Laid-Open No. 2002-63202 discusses a technique of retrieving a character string index with an index key that includes unified capital or lower case letters in advance changed from the original English letters. This technique enables a retrieval condition of a specified character string with mixed capital and lower case letters to be applied to retrieve each record including a character string with the same spelling as that of the specified character string without differentiating between capital and lower-case letters.

On the other hand, an application that ensures the uniqueness of each ID with case insensitivity may be used with an application that ensures that with case sensitivity. In such an environment, IDs used with various kinds of applications may be generally managed in a system.

SUMMARY

In light of the above-described issues, some embodiments of the present disclosure are directed to a technique of managing identification information even with the mixture of applications different in condition about distinction of upper- and lower-case letters included in the identification information.

According to an aspect of some embodiments, an information processing apparatus includes an acquisition unit configured to acquire data with a first schema and data with a second schema, the data with the first schema including case-insensitive first identification information in identification information for management of data, the data with the second schema including the first identification information corresponding to the identification information and case-sensitive second identification information in the identification information, and a management unit configured to manage the data with the first schema and the data with the second schema in a retrievable manner.

Further features of various embodiments will become apparent from the following description of exemplary embodiments with reference to the attached drawings.

BRIEF DESCRIPTION OF THE DRAWINGS

FIG. 3 is a diagram illustrating an example of a data structure relating to management of case-insensitive identifications (ID).

FIGS. 4A and 4B are diagrams each illustrating an example of a data structure relating to management of case-sensitive IDs.

FIG. 7 is a flowchart illustrating still another example of processing by the information processing apparatus.

FIG. 8 is a flowchart illustrating still another example of processing by the information processing apparatus.

FIG. 9 is a diagram illustrating an example of a procedure of switching schemas.

DESCRIPTION OF THE EMBODIMENTS

Figure 1:
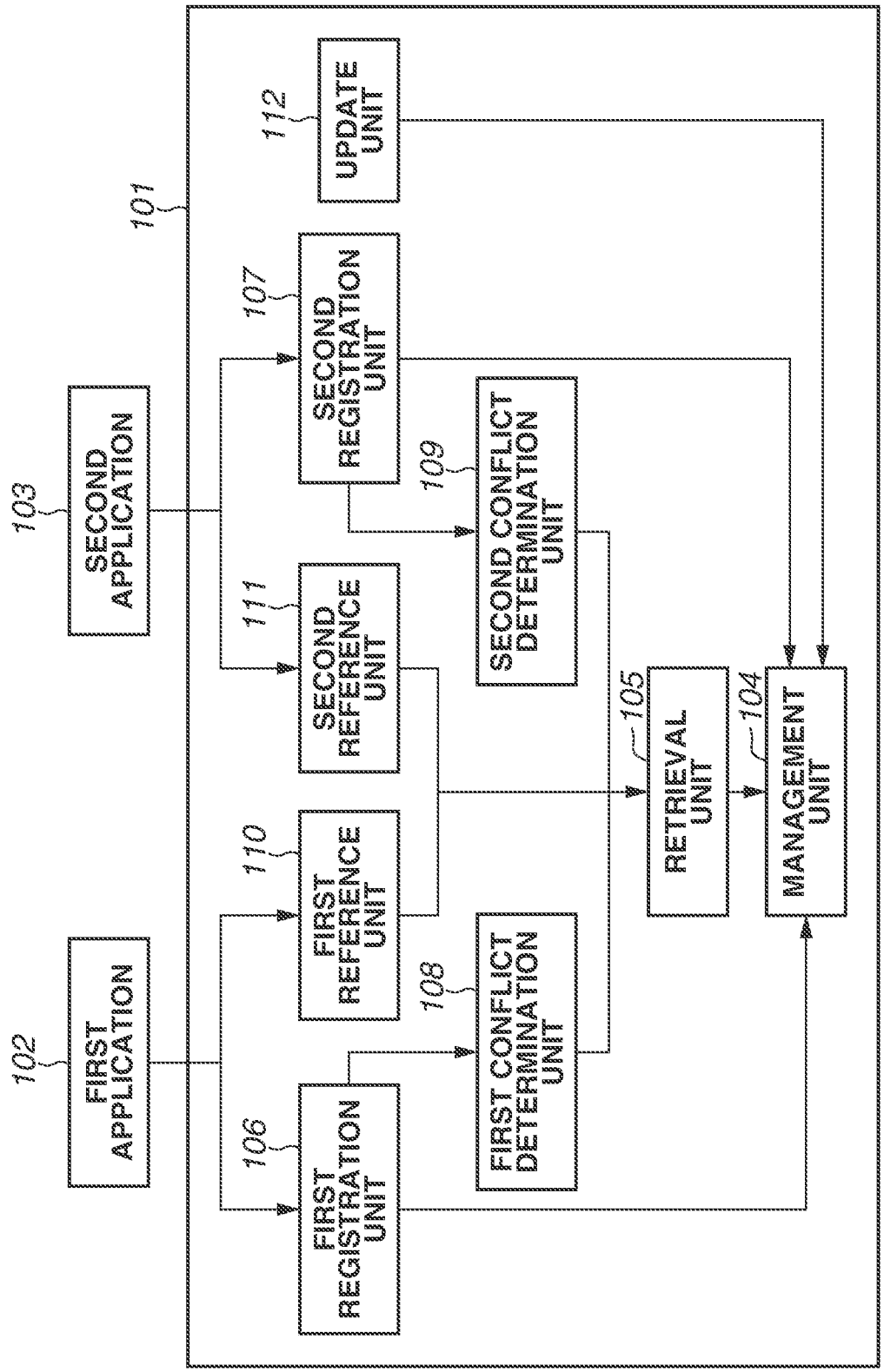
FIG. 1 is a block diagram illustrating an example of a functional configuration of an information processing apparatus.

Some exemplary embodiments of the present disclosure will be described in detail below with reference to accompanying drawings.

In the present specification and the drawings, like numbers refer to like components having substantially identical functional configurations, and repetitive descriptions will be omitted.

<Functional Configuration>

An example of a functional configuration of an information processing apparatus according to an exemplary embodiment will be described with reference to FIG. 1.

An information processing apparatus 101 according to the present exemplary embodiment manages identifications (ID) used by various kinds of applications for data management and other purposes. FIG. 1 illustrates a first application 102 and a second application 103 as examples of the applications.

The first application 102 is schematically illustrated as an application that ensures the uniqueness of each ID, including English capital and lower case letters, used in management of various kinds of data and other purposes with case insensitivity.

In contrast, the second application 103 is schematically illustrated as an application that ensures the uniqueness of each ID, including English capital and lower case letters, used in management of various kinds of data and other purposes with case sensitivity.

In the following description, ensuring the uniqueness of an ID with case sensitivity is also referred to as "case-sensitive", and ensuring the uniqueness of an ID with case insensitivity is also referred to as "case-insensitive".

The information processing apparatus 101 according to the present exemplary embodiment includes a management unit 104, a retrieval unit 105, a first registration unit 106, a second registration unit 107, a first conflict determination unit 108, a second conflict determination unit 109, a first reference unit 110, a second reference unit 111, and an update unit 112.

The management unit 104 manages IDs. For example, the management unit 104 may manage IDs used by various kinds of applications in management of various kinds of data. As a specific example, an ID used by the first application 102 and the second application 103 starts being managed through the processing of registration of the ID by the first registration unit 106 or the second registration unit 107, which will be described below, with the management unit 104.

The retrieval unit 105 retrieves an ID. For example, the retrieval unit 105 may retrieve an ID satisfying a specified condition from among the IDs managed by the management unit 104. As a specific example, in response to a request from the first application 102 or the second application 103, the retrieval unit 105 may retrieve an ID used by the applications from among the IDs managed by the management unit 104.

The first registration unit 106 and the second registration unit 107 register a specified IDs with a predetermined registration destination. For example, the first registration unit 106 and the second registration unit 107 each may register a specified ID subject to management by the management unit 104. The specified ID is registered as a case-insensitive ID by the first registration unit 106 with the management unit 104, and as a case-sensitive ID by the second registration unit 107 with the management unit 104.

The above-described ID registered by the first registration unit 106 or the second registration unit 107 (e.g., ID used by first application 102 or second application 103) is an example of "identification information" used in management of data. Further, the above-described case-insensitive ID is an example of "first identification information", and the above-described case-sensitive ID is an example of "second identification information".

The first conflict determination unit 108 and the second conflict determination unit 109 each determine whether the conflict of the ID occurs (i.e., whether a similar ID has been already registered) in the registration of an ID. More specifically, when the first registration unit 106 registers an ID, the first conflict determination unit 108 may determine whether the conflict of the ID occurs; when the second registration unit 107 registers an ID, the second conflict determination unit 109 may determine whether the conflict of the ID occurs.

The first reference unit 110 and the second reference unit 111 each perform processing in reference to an ID registered with a predetermined registration destination and processing in reference to data including the ID. For example, the first reference unit 110 and the second reference unit 111 each may refer to a specified ID or data including the ID among the registered IDs subject to management by the management unit 104. The first reference unit 110 may refer to the ID registered by the first registration unit 106 with case insensitivity; the second reference unit 111 may refer to the ID registered by the second registration unit 107 with case sensitivity.

The update unit 112 performs a schema-update of a case-insensitive ID to a case-sensitive ID.

The details of processing in update of an ID by the update unit 112 will be separately described below.

The functional configuration illustrated in FIG. 1 is a mere example, and does not limit the functional configuration of all embodiments of the information processing apparatus 101 to the present exemplary embodiment. For example, at least some of the above-described components of the information processing apparatus 101 may function by cooperation of a plurality of devices.

As a specific example, some of the above-described components of the information processing apparatus 101 may be provided in another apparatus. Further, as another example, the load of the processing of at least some of the above-described components of the information processing apparatus 101 may be distributed to a plurality of devices.

<Hardware Configuration>

Figure 2:
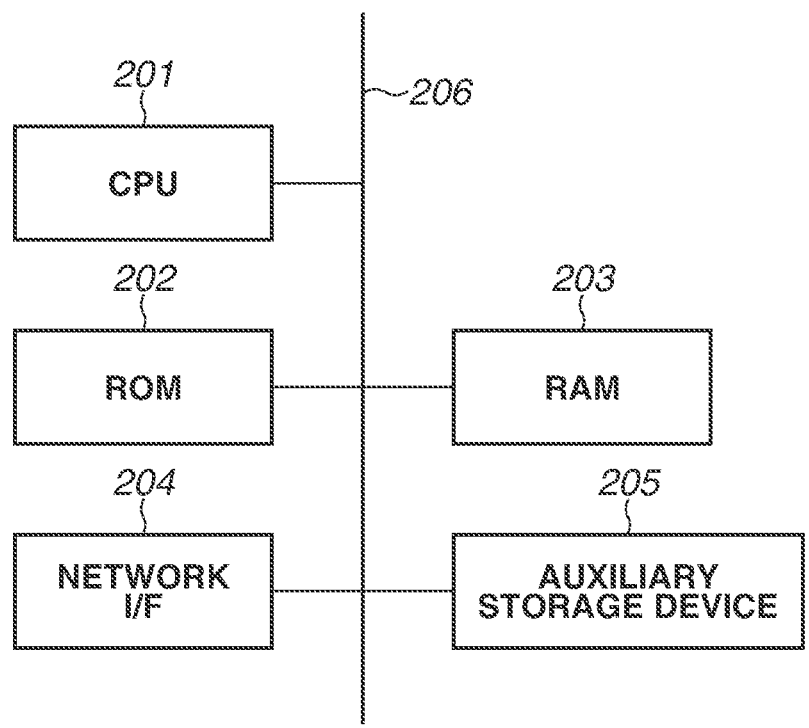
FIG. 2 is a diagram illustrating an example of a hardware configuration of the information processing apparatus.

An example of a hardware configuration of the information processing apparatus 101 according to the present exemplary embodiment will be described with reference to FIG. 2. As illustrated in FIG. 2, the information processing apparatus 101 according to the present exemplary embodiment includes a central processing unit (CPU) 201, a read only memory (ROM) 202, and a random access memory (RAM) 203. The information processing apparatus 101 further includes a network interface (I/F) 204 and an auxiliary storage device 205. The CPU 201, the ROM 202, the RAM 203, the network I/F 204, and the auxiliary storage device 205 are connected to one another through a bus 206.

The CPU 201 controls various kinds of operation of the information processing apparatus 101. For example, the CPU 201 may control the operation of the whole of the information processing apparatus 101. The ROM 202 stores control programs, a boot program, etc. that can be run by the CPU 201. The RAM 203 is a main storage memory for the CPU 201, and is used as a work area or a temporary storage area for loading various kinds of programs.

The network I/F 204 is used to carry out communication with an external apparatus through a network (e.g., Internet). A device used as the network I/F 204 may be appropriately changed depending on the type of a communication path and a communication system used.

The auxiliary storage device 205 stores various kinds of data and various kinds of programs. The auxiliary storage device 205 is a storage device that can temporarily or persistently store various kinds of data, for example, a nonvolatile memory, such as a hard disk drive (HDD) or a solid state drive (SSD). Further, as another example, the auxiliary storage device 205 may be an optical disk such as a flexible disk (FD) or a compact disk (CD), a magnetic card, an optical card, an integrated circuit (IC) card, or a memory card.

The CPU 201 loads programs stored in the ROM 202 or the auxiliary storage device 205 in the RAM 203 to run them to operate the functional configuration illustrated in FIG. 1. Further, programs run by the CPU 201 enable the processing illustrated in FIG. 5 to FIG. 8 to be performed.

<Data Structure>

An example of a data structure (hereinafter, also referred to as "schema") for management of IDs by the management unit 104 will be described with reference to FIG. 3 and FIGS. 4A and 4B.

First, the data structure in FIG. 3 will be described. FIG. 3 illustrates an example of a schema (hereinafter, also referred to as "first schema") for management of information about IDs registered as IDs with case insensitivity by the first registration unit 106.

As illustrated in FIG. 3, the first schema includes a primary key 301 and a sub key 302. The management unit 104 performs management to enable each piece of data to be uniquely identified by a composite key including the primary key 301 and the sub key 302.

In the present exemplary embodiment, the first registration unit 106 converts the alphabetical letters in a character string constituting an ID to be registered into the lower-case letters to specify the case-insensitive ID to the primary key 301. With "AdminUser001" as an original ID, for specific example, the case-insensitive ID "adminuser001" is specified to the primary key 301.

To the sub key 302, information about an attribute of the ID for distinction from the other IDs (devices, applications, etc.) is specified. For example, in the example illustrated in FIG. 3, "User" representing an ID of a user is specified to the sub key 302. In some embodiments, information about an attribute of an ID is not specified to the sub key 302 in the first schema according to the present exemplary embodiment.

Further, in the first schema, various kinds of information may be settable as attribute information 303. For example, in the example illustrated in FIG. 3, a password associated with the ID (e.g., a password used in authentication with the ID), a registration date of the ID, and other kinds of information are set as the attribute information 303.

Further, in the first schema, information representing the type of the schema for management of the ID is set as a schema version 304. For example, in the example of FIG. 3, a value "0" that means that the first schema to manage the ID as a case-insensitive ID is used is set to the schema version 304.

Next, the data structures in FIGS. 4A and 4B will be described. FIGS. 4A and 4B each illustrate an example of a schema (hereinafter, also referred to as "second schema") for management of information about an ID registered as an ID with case sensitivity by the second registration unit 107. FIGS. 4A and 4B illustrate examples of information about IDs different in case from each other. More specifically, FIG. 4A illustrates an example of a character string "AdminUser002" as an ID. In contrast, FIG. 4B illustrates an example of a character string "ADMINUSER002" as an ID.

As illustrated in FIGS. 4A and 4B, the second schema includes a primary key 401 and a sub key 402. The primary key 401 and the sub key 402 correspond to the primary key 301 and the sub key 302 in the first schema described with reference to FIG. 3, respectively.

In the present exemplary embodiment, as in the example illustrated in FIG. 3, the second registration unit 107 converts the alphabetical letters in a character string constituting an ID to be registered into the lower-case letters to specify the case-insensitive ID to the primary key 401. In the example illustrated in each of FIGS. 4A and 4B, the alphabetical letters in the character string as the original ID are converted into the lower-case letters, and "adminuser002" is similarly set to the primary key 401.

To the sub key 402, information about an attribute of the ID for distinction from the other IDs (devices, applications, etc.) and information representing the ID as a case-sensitive ID are specified. In the examples illustrated in FIGS. 4A and 4B, the information consisting of a prefix "User-" plus a case-sensitive ID as a specific example is specified to the sub key 402. As a result, the information including the original case-sensitive ID is set to the sub key 402. FIGS. 4A and 4B illustrate examples, and the format of the information is not limited as long as information including a case-sensitive ID is set to the sub key 402.

As described above, the examples in FIGS. 4A and 4B illustrate the pieces of information common to both primary keys 401 but different between both sub keys 402, and the composite key including the primary key 401 and the sub key allows the uniqueness to be ensured.

Further, in the second schema, various kinds of information may be settable as the attribute information 303 as in the first schema described with reference to FIG. 3.

In the second schema, information representing the type of the schema in management of the ID is set as a schema version 403. In the examples illustrated in FIGS. 4A and 4B, a value "1" that means that the second schema to manage the ID as a case-sensitive ID is used is set to both schema versions 403.

The management unit 104 manages the first schema for management of the information associated with the case-insensitive ID illustrated in FIG. 3 and the second schema for management of the information associated with the case-sensitive IDs illustrated in FIGS. 4A and 4B, in a common database. As described above, even with the mixture of data having the first schema with data having the second schema, a composite key including a primary key and a sub key allows the uniqueness of each ID among registered pieces of data to be ensured.

The retrieval unit 105 retrieves one or more pieces of data with a matched case-insensitive ID managed as the primary key, from the pieces of data managed by the management unit 104. In the examples illustrated in FIGS. 4A and 4B, for specific example, the retrieval unit 105 may retrieve all the pieces of data with "adminuser002" as the primary key and "User-" with which information starts as the sub key. The data subject to retrieval by the retrieval unit 105 can include both data with the first schema in FIG. 3 and data with the second schema in FIGS. 4A and 4B. This means that pieces of data in FIGS. 4A and 4B are included in results of the retrieval.

<Processing>

Some examples of processing by the information processing apparatus 101 according to the present exemplary embodiment will be described with main attention payed to processing in management (e.g., registration and reference) of an ID with reference to FIG. 5 to FIG. 8.

Figure 5:
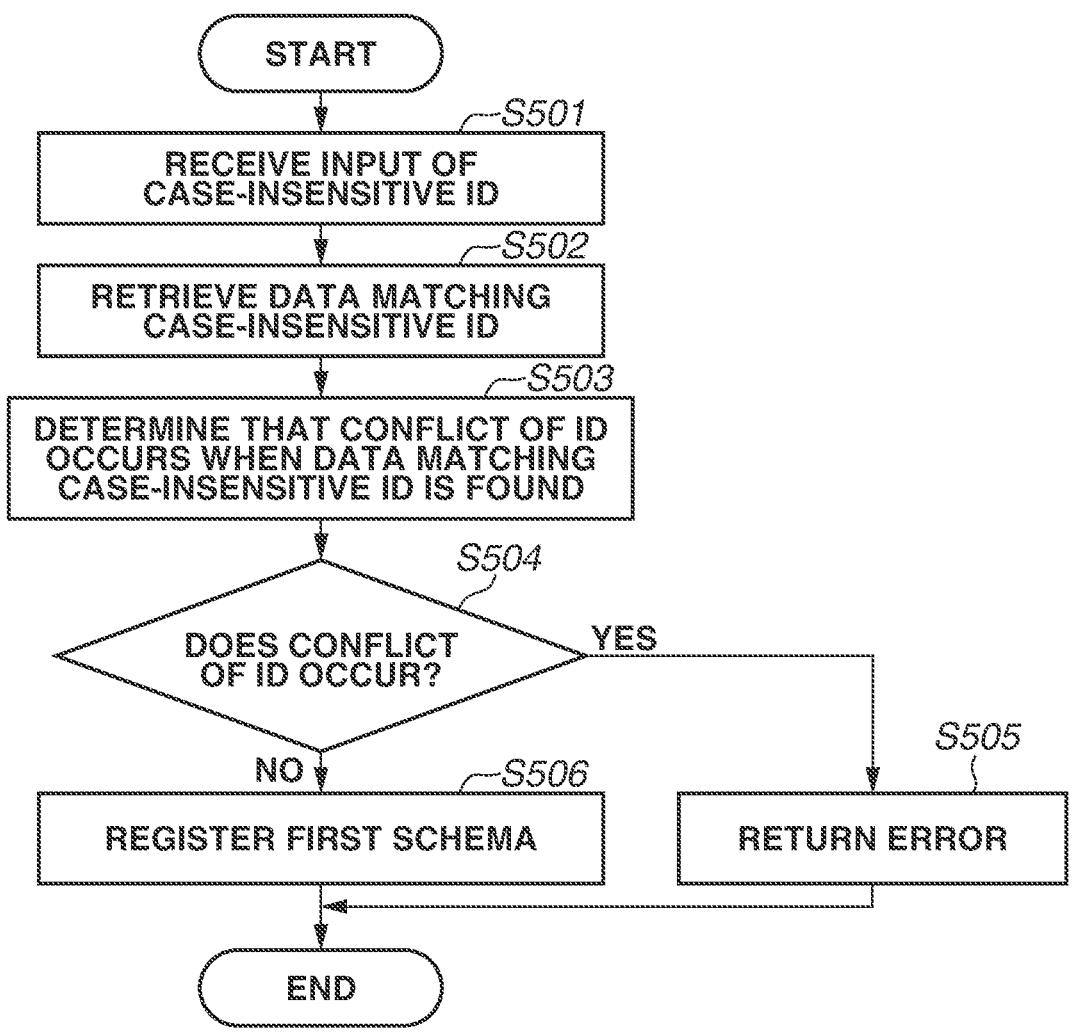
FIG. 5 is a flowchart illustrating an example of processing by the information processing apparatus.

First, an example of a processing procedure of registering an ID used by the first application 102 with the management unit 104, the ID of which is to be managed as a case-insensitive ID by the management unit 104, will be described with reference to FIG. 5.

In S501, the first registration unit 106 receives an input of an ID to be registered from the first application 102. The first application 102 is an application using case-insensitive IDs. This means that the first registration unit 106 receives an input of a case-insensitive ID that has lost the case information due to, for example, the conversion of the alphabetical letters in the character string constituting the ID into the lower-case letters.

The format of the case-insensitive ID is not limited to the above-described example as long as the format can ensure the uniqueness of an ID with case-insensitivity. For example, the information processing apparatus 101 may receive an input of a case-insensitive ID that has lost the case information due to the conversion of the alphabetical letters in the character string constituting the ID into the upper-case letters.

Next, in S502 to S504, whether the conflict of the ID received as an input by the first registration unit 106 occurs is determined.

More specifically, in S502, the retrieval unit 105 retrieves data including an ID matching the ID received as an input by the first registration unit 106 (i.e., an ID to be registered). Further specifically, the first conflict determination unit 108 instructs the retrieval unit 105 to retrieve data including an ID matching the ID to be registered, based on a request from the first registration unit 106. In response to the instruction from the first conflict determination unit 108, the retrieval unit 105 retrieves data including an ID matching the ID (an ID to be registered) specified by the first conflict determination unit 108 from the pieces of data managed by the management unit 104. The retrieval method is as described above. In this case, the data with the first schema and the data with the second schema are both subject to retrieval.

In S503, the first conflict determination unit 108 determines whether the conflict of the ID (an ID to be registered) received as an input by the first registration unit 106 occurs based on the result of the retrieval by the retrieval unit 105 in S502. More specifically, if data including an ID matching the ID to be registered is found by the retrieval unit 105, the first conflict determination unit 108 determines that the conflict of the ID to be registered occurs. In this case, the case-insensitive conflict determination with the ID to be registered is made on both the data with the first schema representing the information about the case-insensitive ID and the data with the second schema representing the information about the case-sensitive ID.

In S504, the first registration unit 106 checks the result of the determination of whether the conflict of the ID occurs made by the first conflict determination unit 108 in S503, and switches the subsequent processing based on the determination result.

More specifically, if the first registration unit 106 receives the determination result that means that the conflict of the ID occurs in S504 (YES in S504), the processing proceeds to S505. In S505, the first registration unit 106 returns an error that means that the conflict of the specified ID (ID to be registered) occurs, to the first application 102 as the request source. The processing illustrated in FIG. 5 then ends. For specific example, if the information processing apparatus 101 provides various kinds of applications with functions through representational state transfer application programming interface (REST API), an error of "status code 409 Conflict" is returned to the request source application.

In contrast, if the first registration unit 106 receives the determination result that means that the conflict of the ID does not occur in S504 (NO in S504), the processing proceeds to S506. In S506, the first registration unit 106 registers with the management unit 104 the data including the specified ID as data with the first schema. As a result, the ID becomes subject to management performed by the management unit 104. After that, the first registration unit 106 notifies the first application 102 as the request source that the registration of the specified ID (an ID to be registered) has been normally completed. The processing illustrated in FIG. 5 then ends.

Figure 6:
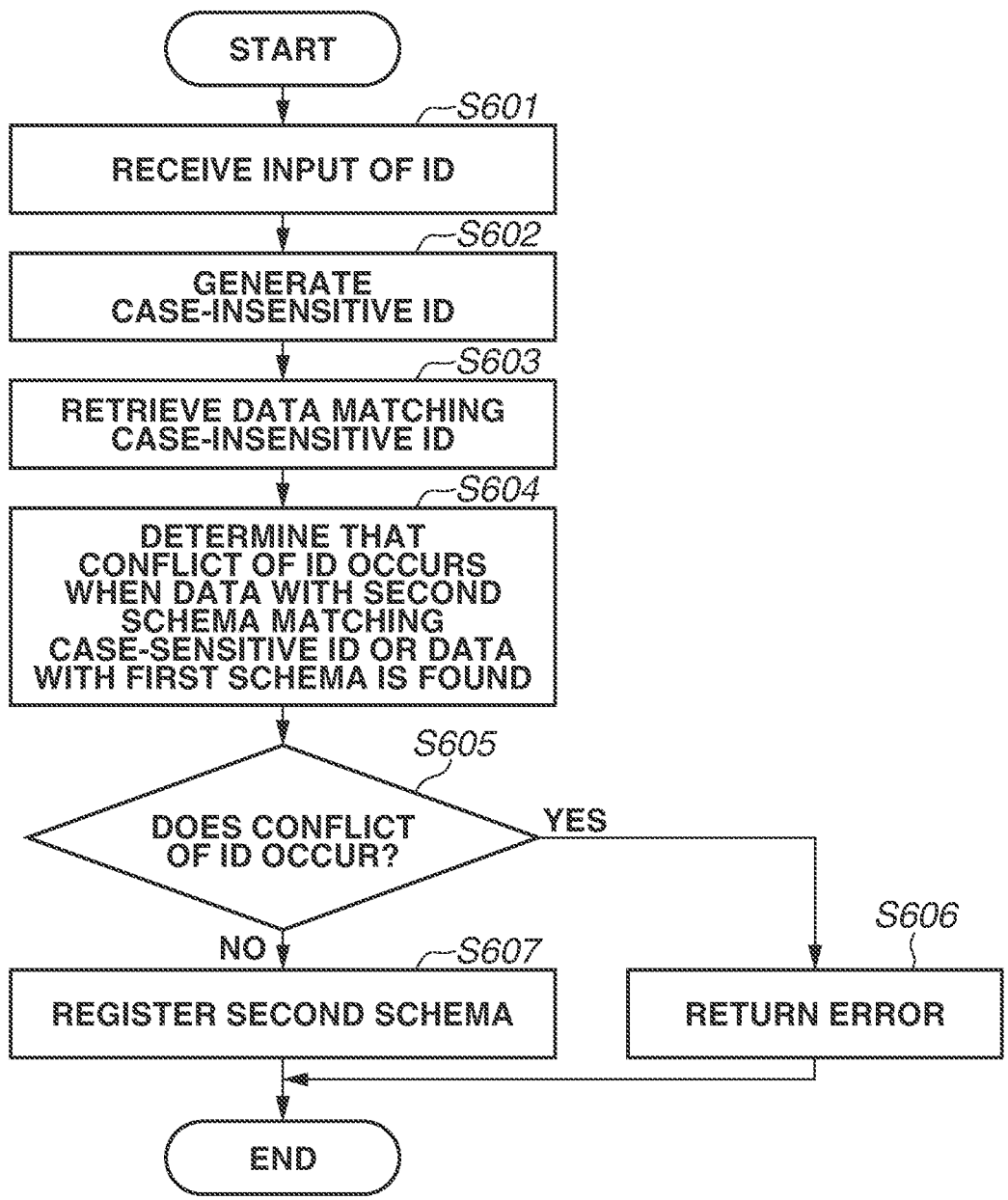
FIG. 6 is a flowchart illustrating another example of processing by the information processing apparatus.

Next, an example of a processing procedure of registering an ID used by the second application 103, the ID of which is to be managed by the management unit 104 as a case-sensitive ID will be described with reference to FIG. 6.

In S601, the second registration unit 107 receives an input of an ID to be registered from the second application 103. The second application 103 is an application using case-sensitive IDs. This means that the second registration unit 107 receives an input of an ID with case information from the second application 103.

In S602, the second registration unit 107 generates a case-insensitive ID from the ID received as an input from the second application 103.

In S603, the retrieval unit 105 retrieves data including an ID matching the case-insensitive ID generated in S602 with case insensitivity. The retrieval method is as described above. In this case, data with the first schema and data with the second schema are both subject to the retrieval.

In S604, the second conflict determination unit 109 determines whether the conflict of the ID received an input by the second registration unit 107 occurs based on the result of the retrieval by the retrieval unit 105 in S603. More specifically, if data with the second schema or with the first schema, the data in which the case-sensitive ID in the sub key 402 matches the ID to be registered, is found, the second conflict determination unit 109 determines that the conflict of the ID to be registered occurs.

In each example in FIGS. 4A and 4B, the part after "User-" corresponds to the case-sensitive ID in the character string set to the sub key 402 of the data with the second schema. In this case, the case-insensitive conflict determination of the ID is made on the data with the first schema, and the case-sensitive conflict determination of the ID is made on the data with the second schema.

In S605, the second registration unit 107 checks the result of the determination of whether conflict of the ID occurs made by the second conflict determination unit 109 in S604, and switches the subsequent processing based on the determination result.

More specifically, if the second registration unit 107 receives the determination result that means that the conflict of the ID occurs in S605 (YES in S605), the processing proceeds to S606. In S606, the second registration unit 107 returns an error that means that the conflict of the specified ID (an ID to be registered) occurs to the second application 103 as the request source. The processing in FIG. 6 then ends.

In contrast, if the second registration unit 107 receives the determination result that means that the conflict of the ID does not occur in S605 (NO in S605), the processing proceeds to S607. In S607, the second registration unit 107 registers the data including the specified ID as data with the second schema in the management unit 104. As a result, the ID becomes subject to management performed by the management unit 104. After that, the second registration unit 107 notifies the second application 103 as the request source that the registration of the specified ID (ID to be registered) has been normally completed. The processing illustrated in FIG. 6 then ends.

Next, an example of a processing procedure of retrieving data including an ID matching an ID used by the first application 102 from the data managed by the management unit 104 with case insensitivity, and of referring to the data will be described with reference to FIG. 7.

In S701, the first reference unit 110 receives an input of an ID to be referred to from the first application 102. The first application 102 is an application using case-insensitive IDs. This means that the first reference unit 110 receives from the first application 102 an input of a case-insensitive ID that has lost the case information due to, for example, the conversion of the alphabetical letters in the character string constituting the ID into the lower-case letters.

In S702, in response to an instruction from the first reference unit 110, the retrieval unit 105 retrieves data including an ID matching the ID (i.e., an ID to be referred to) received by the first reference unit 110 as an input from the pieces of data managed by the management unit 104. The retrieval method is as described above. In this case, data with the first schema and data with the second schema are both subject to the retrieval.

In S703, if data with the first schema is included in the result of the retrieval by the retrieval unit 105 in S702, the first reference unit 110 determines the data to include an ID matching the ID received as an input from the first application 102.

In S704, the first reference unit 110 switches the subsequent processing according to the result of the determination based on the result of the retrieval of data including an ID matching the ID to be referred to by the retrieval unit 105 in S703.

More specifically, if data determined to include an ID matching the ID to be referred to is found in S704 (YES in S704), the processing proceeds to S705. In S705, the first reference unit 110 returns the data determined to include an ID matching the ID to be referred to (i.e., the data found by retrieval unit 105) to the first application 102 as the request source. The processing illustrated in FIG. 7 then ends.

In contrast, if no data determined to include an ID matching the ID to be referred to is found in S704 (NO in S704), the processing proceeds to S706. In S706, the first reference unit 110 returns an error that means that no data including an ID matching the ID to be referred to is present to the first application 102 as the request source. The processing in FIG. 7 then ends. For specific example, if the information processing apparatus 101 provides various kinds of applications with functions through REST API, an error of "status code 404 Not Found" is returned to the request source application.

Next, an example of a processing procedure of retrieving data including an ID matching an ID used by the second application 103 from the data managed by the management unit 104 with case sensitivity, and of referring to the data, will be described with reference to FIG. 8.

In S801, the second reference unit 111 receives an input of an ID to be referred to from the second application 103. The second application 103 is an application using case-sensitive IDs. This means that the second reference unit 111 receives an input of an ID with case information from the second application 103. In S802, the second reference unit 111 generates a case-insensitive ID from the ID received as an input from the second application 103.

In S803, the retrieval unit 105 retrieves data including an ID matching the case-insensitive ID generated in S802 with case insensitivity. The retrieval method is described above. In this case, data with the first schema and data with the second schema are both subject to the retrieval.

In S804, if data with the first schema is included in the result of the retrieval by the retrieval unit 105 in S803, the second reference unit 111 determines the data to include an ID matching the ID received as an input from the second application 103. Further, if data with the second schema or with the first schema and including an ID matching the case-sensitive ID is included in the result of the retrieval, the second reference unit 111 similarly makes a similar determination.

In S805, the second reference unit 111 switches the subsequent processing according to the result of the determination based on the result of the retrieval of data including an ID matching the ID to be referred to by the retrieval unit 105 in S804. More specifically, the second reference unit 111 determines whether data with the second schema or with the first schema, the data in which the case-sensitive ID in the sub key 402 is included, is found.

If data determined to include an ID matching the ID to be referred to is found in S805 (YES in S805), the processing proceeds to S806. In S806, the second reference unit 111 returns the data determined to include an ID matching the ID to be referred to (i.e., the data found by retrieval unit 105) to the second application 103 as the request source. The processing illustrated in FIG. 8 then ends.

In contrast, if no data determined to include an ID matching the ID to be referred to is found in S805 (NO in S805), the processing proceeds to S807. In S807, the second reference unit 111 returns an error that means that no data including an ID matching the ID to be referred to is present to the second application 103 as the request source. The processing in FIG. 8 then ends.

<Action and Effects>

The above-described configuration enables the information processing apparatus 101 according to the present exemplary embodiment to carry out the functions described below.

1. The conflict determination of an ID used with case insensitivity is made on both IDs registered with case insensitivity and IDs registered with case sensitivity, under a case-insensitive condition.
2. In determination of a match between an ID used with case insensitivity and registered IDs, the determination is made on IDs registered with case insensitivity but the IDs registered with case sensitivity.
3. The conflict determination of an ID used with case sensitivity is made on IDs registered with case insensitivity under a case-insensitive condition, or on the IDs registered with case sensitivity under a case-sensitive condition.
4. In determination of a match between an ID used with case sensitivity and registered IDs, the determination with case insensitivity is made on the IDs registered with case insensitivity or the determination with case sensitivity is made on the IDs registered with case sensitivity.

<Modifications>

Some modifications of the information processing apparatus 101 according to the present exemplary embodiment will be described.

(First Modification)

A first modification of the information processing apparatus 101 according to the present exemplary embodiment will be described.

In the above-described exemplary embodiment, the reference to an ID registered based on a request from the second application 103 by the first application 102 is restricted. An ID registered based on a request from the first application 102 is subject to reference to from the second application under a case-insensitive condition.

On the other hand, it is assumed that, with an update of an application, the ID management method by the application may be changed from a case-insensitive management method to a case-sensitive management method.

In light of such a situation, in the present modification, an example will be described of a method of switching an ID management method from case-insensitive management to case-sensitive management.

In the present modification, the first application 102 is switched to the second application 103 by an update or other opportunities. It is assumed that no ID registered based on a request from the second application 103 is referred to by the first application 102. On the other hand, the management of an ID registered based on a request from the first application 102 continues with case-insensitivity (based on the first schema). This can entail a change of management of an ID from management based on the first schema to management based on the second schema to enable the ID to be referred to with case-sensitivity or to be registered with a different case.

An example will be described with reference to FIG. 9 of a procedure of switching a case-insensitive ID registered based on a request from the first application 102 and managed based on the first schema, to a case-sensitive ID managed based on the second schema.

In S901, the state schematically means that various kinds of applications each corresponding to the first application 102 are subject to management and have not yet been updated to the second application 103. This means that, in S901, the information processing apparatus 101 manages the IDs used by the above-described various kinds of applications subject to management based on the first schema described with reference to FIG. 3. This involves use of the primary key 301 and the sub key 302 of the first schema for registration of and reference to an ID.

S902 to S905 correspond to a procedure of updating an application and switching of the management of IDs used by the application with the update.

More specifically, in S902, various kinds of procedures are first performed of switching a main device performing management of the IDs used by the application to the information processing apparatus 101 according to the present exemplary embodiment. For specific example, the various kinds of procedures may be of switching the routing to a uniform resource locator (URL) by Domain Name System (DNS) from an original information processing apparatus as a main device performing ID management to the information processing apparatus 101 according to the present exemplary embodiment. Such procedures allow a switch of the main device performing ID management from the original information processing apparatus to the information processing apparatus 101 according to the present exemplary embodiment without correcting the application that uses the IDs (first application 102).

In addition, in S902, the application performs registration of and reference to an ID with case-insensitivity similarly to the manner before the update, and the information processing apparatus as a main device performing ID management also performs the ID management based on the first schema, but preparation for processing on the second schema is completed.

In S903, the application is switched from the first application 102 to the second application 103 to carry out similar functions through the update. On the other hand, it can be assumed that plural first applications 102 are used for each of the functions. In such a case, for example, each application is sequentially switched.

In S903, while the applications are sequentially switched, the first application 102 and the second application 103 may mingle each as an application that performs registration of and reference to an ID, among the applications. Even in such a case, the information processing apparatus 101 as the main device performing ID management enables the processing to be selectively switched based on whether the application as a request source of registration of and reference to an ID is the first application 102 or the second application 103.

More specifically, if the application as the first application 102 is a request source, the registration of and reference to an ID are performed with case-insensitivity. In contrast, if the application as the second application 103 is a request source, the registration of and reference to an ID are performed with case-sensitivity. However, the reference to or conflict determination of an ID registered by the first application 102 based on a request from the second application 103 is performed with case-insensitivity.

In S904, the applications have been completely all switched from the first application 102 to the second application 103 with the progress of the processing in S903. In other words, in S904, it is not assumed that reference to and registration of an ID are performed based on a request from the first application 102. On the other hand, any ID registered based on a request from the first application 102 still remains. Thus, if the reference to or conflict determination of an ID registered by the first application 102 is performed based on a request from the second application 103, the processing is still performed with case-insensitivity.

In S905, the update unit 112 updates data with the first schema to the data with the second schema. The data with the first schema may not hold information about an original case-sensitive ID. In such a case, the update unit 122 acquires information (e.g., ID itself) about the original ID from another service or database, and updates the data with the first schema to the data with the second schema by using the information about the original ID. The method of acquiring information about the original ID is not limited as long as the update unit 112 can acquire information about the original ID.

Further, when the data with the first schema is updated to the data with the second schema, the data may be referred to by an application (second application 103). Thus, for example, the update unit 112 may make an update by generating the data with the second schema as updated data and by deleting the data with the first schema to be updated. Such control does not provide a period of no data corresponding to the ID to be used. This makes it possible to prevent occurrence of no data corresponding to the ID used by the application when the application refers to the data.

In an update of the schema in the above-described manner, the data with the first schema, in which the ID is managed with case-insensitivity based on a request from the first application 102, is updated to the data with the second schema, in which the ID is managed with case-sensitivity. This enables an application, which is switched from the first application 102 to the second application 103 by update, to perform registration of and reference to the ID with case-sensitivity.

As described above, updating an information processing apparatus serving as a main device performing management of IDs and an application using the IDs makes it possible to switch the ID management from case-insensitive management to case-sensitive management without stopping use of the application by the user.

(Second Modification)

A second modification of the information processing apparatus 101 according to the present exemplary embodiment will be described.

In the above-described exemplary embodiment, the example has been described of managing a case-sensitive ID (e.g., a character string obtained by converting the letters of an original ID into the lower-case letters) as the primary key 301 or 401 and a case-insensitive ID (e.g., a character string including an original ID) as the sub key 402.

On the other hand, the management method is not limited as long as retrieval using a case-insensitive ID can be performed while the data with the second schema includes both the case-insensitive ID and the case-sensitive ID as keys and the data with the first schema and the data with the second schema each have the uniqueness.

Further, pieces of information set as the primary key and the sub key are not limited to a case-sensitive ID itself and a case-insensitive ID itself, and may be information obtained by converting the IDs into another format based on a predetermined algorithm. For specific example, character strings obtained by converting a case-sensitive ID and a case-insensitive ID into hash values may be respectively set as the primary key and the sub key.

The processing of converting IDs into hash values by an application may make it difficult for the information processing apparatus 101 to generate a hash value converted from a case-insensitive ID from a hash value converted from a case-sensitive ID. In such a case, the information processing apparatus 101 receives an input of both the hash value converted from the case-sensitive ID and the hash value converted from the case-insensitive ID, from the request source application (second application 103).

(Third Modification)

A third modification of the information processing apparatus 101 according to the present exemplary embodiment will be described.

In the above-described exemplary embodiment, the first reference unit 110 and the second reference unit 111 each perform ID match determination on data with the first schema and on data with the second schema, and return data to the request source application according to the result of a determination. The technique according to the present exemplary embodiment is applicable to the implementation of other functions without being limited to reference to data illustrated above.

For example, a so-called authentication service can be carried out by using the information processing apparatus 101 according to the present exemplary embodiment. In this case, the information processing apparatus 101 according to the present exemplary embodiment may receive the input of authentication information, such as a password, in addition to the ID, from an application, such as the first application 102 or the second application 103. In this case, for example, the information processing apparatus 101 may include an authentication unit that collates authentication information received as an input from the request source application in addition to the ID, with the authentication information included in data referred to by the first reference unit 110 or the second reference unit 111.

For example, if the received authentication information matches the authentication information included in data, the above-described authentication unit may determine that the authentication is successful and issue an authentication token, and return the authentication token to the request source application. Further, for example, if the received authentication information does not match the authentication information included in data, the above-described authentication unit may determine that the authentication failed, and return an error about the authentication to the request source application.

As described above, the technique according to the present exemplary embodiment is applicable to the implementation of other functions such as the authentication function without being limited to reference to data, enabling the management of case-insensitive IDs and the management of case-sensitive IDs to be performed in a more suitable manner.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-153996, which was filed on Sep. 14, 2020 and which is hereby incorporated by reference herein in its entirety.

What is claimed is:

1. An information processing apparatus, comprising:
one or more memories storing instructions, and
one or more processors coupled to the one or more memories,
wherein execution of the instructions causes the one or more processors to:
acquire first data with a first schema and second data with a second schema, the first data and the second data including identification information for management of data, the first data including case-insensitive first identification information in the identification information, the second data including case-insensitive second identification information and case-sensitive second identification information in the identification information;
acquire third data including case-sensitive third identification information from application software;
generate case-insensitive fourth identification information based on the case-sensitive third identification information; and
determine whether the case-insensitive fourth identification information matches the case-insensitive first identification information and whether the case-sensitive third identification information matches the case-sensitive second identification information.

2. The information processing apparatus according to claim 1, wherein execution of the instructions further causes the one or more processors to, in a case where the case-insensitive fourth identification information does not match the case-insensitive first identification information and the case-sensitive third identification information does not match the case-sensitive second identification information, register the third data with the second schema.

3. The information processing apparatus according to claim 1, wherein execution of the instructions further causes the one or more processors to, in a case where the case-sensitive third identification information matches the case-sensitive second identification information, return the second data to the application software.

4. The information processing apparatus according to claim 1, wherein execution of the instructions further causes the one or more processors to:
in a case where the case-insensitive fourth identification information matches the case-insensitive first identification information, determine whether the first data further include case-sensitive first identification information;

in a case where the first data further include the case-sensitive first identification information, determine whether the case-sensitive first identification information matches the case-sensitive third identification information; and in a case where the case-sensitive first identification information matches the case-sensitive third identification information, return the first data to the application software.

5. The information processing apparatus according to claim 1, wherein execution of the instructions further causes the one or more processors to authentication based on the case-sensitive third identification information in a case where the case-insensitive fourth identification information matches the case-insensitive first identification information or the case-sensitive third identification information matches the case-sensitive second identification.

6. The information processing apparatus according to claim 1, wherein the second data includes a composite key that includes the case-insensitive second identification information as a primary key and the case-sensitive second identification information as a sub key.

7. An information processing method performed by an information processing apparatus, the method comprising:

acquiring first data with a first schema and second data with a second schema, the first data and the second data including identification information for management of data, the first data including case-insensitive first identification information in the identification information, the second data including case-insensitive second identification information and case-sensitive second identification information in the identification information;

acquiring third data including case-sensitive third identification information from application software;

generating case-insensitive fourth identification information based on the case-sensitive third identification information; and determining whether the case-insensitive fourth identification information matches the case-insensitive first identification information and whether the case-sensitive third identification information matches the case-sensitive second identification information.

8. A non-transitory storage medium storing a program causing a computer to execute an information processing method, the method comprising:

acquiring first data with a first schema and second data with a second schema, the first data and the second data including identification information for management of data, the first data including case-insensitive first identification information in the identification information, the second data including case-insensitive second identification information and case-sensitive second identification information in the identification information;

acquiring third data including case-sensitive third identification information from application software;

generating case-insensitive fourth identification information based on the case-sensitive third identification information; and determining whether the case-insensitive fourth identification information matches the case-insensitive first identification information and whether the case-sensitive third identification information matches the case-sensitive second identification information.

* * * * *